United States Patent
Yamauchi et al.

(10) Patent No.: US 12,065,194 B2
(45) Date of Patent: Aug. 20, 2024

(54) VEHICLE BODY STRUCTURE

(71) Applicant: MAZDA MOTOR CORPORATION, Hiroshima (JP)

(72) Inventors: Kazuki Yamauchi, Hiroshima (JP); Ippei Kuroda, Hiroshima (JP); Akiko Kawamoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/766,678

(22) PCT Filed: Oct. 9, 2020

(86) PCT No.: PCT/JP2020/038237
§ 371 (c)(1),
(2) Date: Apr. 5, 2022

(87) PCT Pub. No.: WO2021/075362
PCT Pub. Date: Apr. 22, 2021

(65) Prior Publication Data
US 2024/0109598 A1    Apr. 4, 2024

(30) Foreign Application Priority Data

Oct. 16, 2019   (JP) .................................. 2019-189742

(51) Int. Cl.
*B62D 25/14*   (2006.01)
*B62D 25/08*   (2006.01)
*B62D 25/20*   (2006.01)

(52) U.S. Cl.
CPC ......... *B62D 25/145* (2013.01); *B62D 25/082* (2013.01); *B62D 25/2018* (2013.01)

(58) Field of Classification Search
CPC .... B62D 21/155; B62D 21/15; B62D 25/145; B62D 25/20; B62D 25/2045; B62D 27/02;
(Continued)

(56) References Cited

U.S. PATENT DOCUMENTS 6,679,546 B2 *  1/2004  Mishima .............. B62D 25/082
                                                                      296/203.02
9,776,671 B2 * 10/2017  Song .................... B62D 25/145
(Continued)

FOREIGN PATENT DOCUMENTS

DE       102018132532 A1 *  6/2019  ............. B62D 25/14
EP            2371680 A1 * 10/2011  ............. B62D 25/14
(Continued)

OTHER PUBLICATIONS

International Search Report issued in PCT/JP2020/038237; mailed Dec. 8, 2020.
(Continued)

*Primary Examiner* — Pinel E Romain
(74) *Attorney, Agent, or Firm* — Studebaker & Brackett PC

(57) ABSTRACT

A vehicle body structure includes a dashboard extending in a vehicle width direction and defining a cabin and a power compartment in front of the cabin; a power unit arranged in the power compartment; a floor panel extending rearward in the cabin from the dashboard; and a dash crossmember projected forward from the dashboard and extending in the vehicle width direction. The dash crossmember has a first portion at least partially overlapping the power unit in a front view; and a second portion extending outward in the vehicle width direction from the first portion. A compressive strength of the first portion is lower than a compressive strength of the second portion.

7 Claims, 4 Drawing Sheets

(58) Field of Classification Search
CPC .............. B62D 29/007; B62D 25/082; B62D 25/2018; B62D 25/14
USPC .......................... 296/193.07, 187.09, 203.02
See application file for complete search history.

(56) References Cited

U.S. PATENT DOCUMENTS

| | | | | |
|---|---|---|---|---|
| 10,232,891 | B2* | 3/2019 | Yoshida | B62D 25/2036 |
| 2008/0122264 | A1* | 5/2008 | Wrobel | B62D 21/157 |
| | | | | 296/203.02 |
| 2008/0238148 | A1* | 10/2008 | Nakamura | B62D 25/20 |
| | | | | 296/203.01 |
| 2013/0069393 | A1* | 3/2013 | Kihara | B62D 25/08 |
| | | | | 296/203.02 |
| 2017/0001669 | A1* | 1/2017 | Ohigashi | B62D 25/2045 |
| 2017/0080978 | A1* | 3/2017 | Yoshida | B62D 25/2018 |
| 2018/0065676 | A1 | 3/2018 | Yoshida et al. | |
| 2019/0061824 | A1 | 2/2019 | Uchiba et al. | |
| 2022/0009559 | A1* | 1/2022 | Hirose | B62D 21/15 |
| 2022/0348267 | A1* | 11/2022 | Ebisumoto | B62D 25/20 |

FOREIGN PATENT DOCUMENTS

| | | | | |
|---|---|---|---|---|
| EP | 3056413 | A1 * | 8/2016 | .......... B62D 25/082 |
| JP | H10-045034 | A | 2/1998 | |
| JP | 2014-201112 | A | 10/2014 | |
| JP | 2019-038311 | A | 3/2019 | |
| WO | 2016/148057 | A1 | 9/2016 | |

OTHER PUBLICATIONS

The extended European search report issued by the European Patent Office on Oct. 11, 2023, which corresponds to European Patent Application No. 20877928.0-1009 and is related to U.S. Appl. No. 17/766,678.

* cited by examiner

VEHICLE BODY STRUCTURE

TECHNICAL FIELD

The present disclosure relates to a vehicle body structure, in particular, a vehicle body structure for a vehicle in which a dash crossmember projected forward in a vehicle and extending in a vehicle width direction is joined to a cabin outer side of a dashboard.

BACKGROUND ART

In vehicles such as an automobile, a well-known structure includes a dash crossmember projected forward on a cabin outer side of a dashboard and joined to the dashboard to extend in a vehicle width direction. By providing such a dash crossmember, vehicle body rigidity can be improved by transmitting an input load from a suspension in the vehicle width direction during travel of the vehicle.

For example, Japanese Patent Document JP-A-2019-38311 discloses a vehicle body structure in which the dash crossmember projected forward in the vehicle and extending in the vehicle width direction is provided on the cabin outer side of the dashboard.

In recent years, it has become increasingly difficult to secure a sufficient space for a power compartment (for example, an engine compartment) due to a demand for expansion of cabin interior space. In particular, compared to a vehicle with a horizontal layout of a power unit (for example, an engine), in a vehicle with a vertical layout of the power unit and having such a structure, clearance between the dash crossmember and the power unit is small. Thus, in such a vehicle, a space for allowing the power unit to move rearward during a frontal collision is small. As a result, the power unit comes into contact with the dash crossmember due to rearward movement thereof, which possibly deforms the dashboard. In such a case, the power unit is laid out forward to avoid contact with the dash crossmember, or, in the case where the dash crossmember and the power unit come into contact with each other, the dashboard is reinforced to suppress the deformation of the dashboard by applying mass. For this reason, there is room for improvement in terms of avoiding deformation of the dashboard while maintaining design freedom and avoiding an increase in the mass.

SUMMARY

In view of the above, the vehicle body structure of the present disclosure simultaneously maintains vehicle body rigidity against a load in an up-down direction that is input during travel and prevents deformation of a dashboard when a power unit that moves rearward during a frontal collision comes into contact with a dash crossmember, while maintaining design freedom and avoiding an increase in mass.

In order to solve the problem, a vehicle body structure according to an embodiment of the present disclosure includes a dashboard that extends in a vehicle width direction and defines a cabin and a power compartment in front of the cabin; a power unit arranged in the power compartment; a floor panel that extends rearward in the cabin from the dashboard; and a dash crossmember that is projected forward from the dashboard and extends in the vehicle width direction. The dash crossmember has a first portion that at least partially overlaps the power unit in a front view when a vehicle is seen from the front; and a second portion that extends outward in the vehicle width direction from the first portion, wherein compressive strength of the first portion is lower than compressive strength of the second portion.

According to the present disclosure, in the vehicle body structure in which the dash crossmember, which is projected forward in the vehicle and extends in the vehicle width direction, is joined to the cabin outer side of the dashboard, the compressive strength of the dash crossmember is partially lowered. In this way, it is possible to simultaneously ensure vehicle body rigidity against an input load in an up-down direction during travel and prevent deformation of the dashboard when the power unit that moves rearward during a frontal collision comes into contact with the dash crossmember, while maintaining design freedom and avoiding an increase in mass.

DETAILED DESCRIPTION

A description will hereinafter be made of a vehicle body structure according to an embodiment of the present disclosure with reference to the accompanying drawings.

Figure 1:
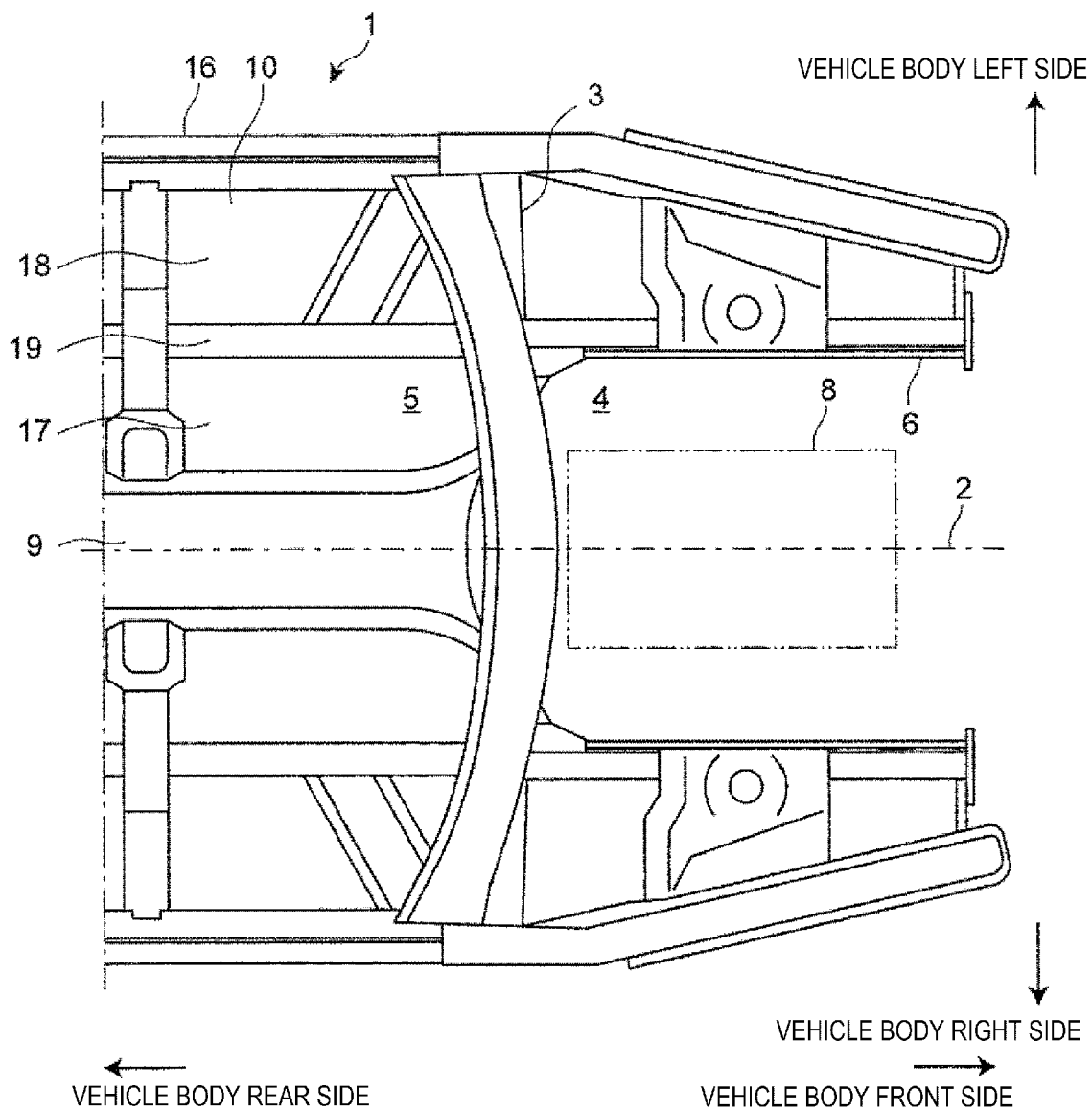
FIG. 1 is a plan view of a vehicle body front portion to which a vehicle body structure according to an embodiment of the present disclosure is applied.

FIG. 1 illustrates a vehicle body structure 1 for a vehicle. This vehicle is a front-engine, rear-wheel-drive vehicle in which an engine as a power unit is vertically mounted. The vehicle body structure 1 has a center axis 2 that extends in a vehicle front-rear direction (a right-left direction in FIG. 1. Hereinafter, this direction will appropriately be referred to as a "front-rear direction"). The vehicle body structure 1 has a dashboard 3 that extends in a vehicle width direction (an up-down direction in FIG. 1. Hereinafter, this direction will appropriately be referred to as a "vehicle width direction") orthogonal to the center axis 2. The dashboard 3 separates an engine compartment 4 (a power compartment) located in front of the dashboard 3 from a cabin 5.

A pair of front side members 6 that is arranged symmetrically about the center axis 2 is arranged in the engine compartment 4. A rear end of each of the front side members 6 is coupled to the dashboard 3 via a dash crossmember 7, which will be described below. Near an intermediate portion of the front side member 6, an engine 8 is arranged almost on the center axis 2. The engine 8 is supported on the vehicle body structure 1 by an engine support frame, which is not illustrated.

Figure 4:
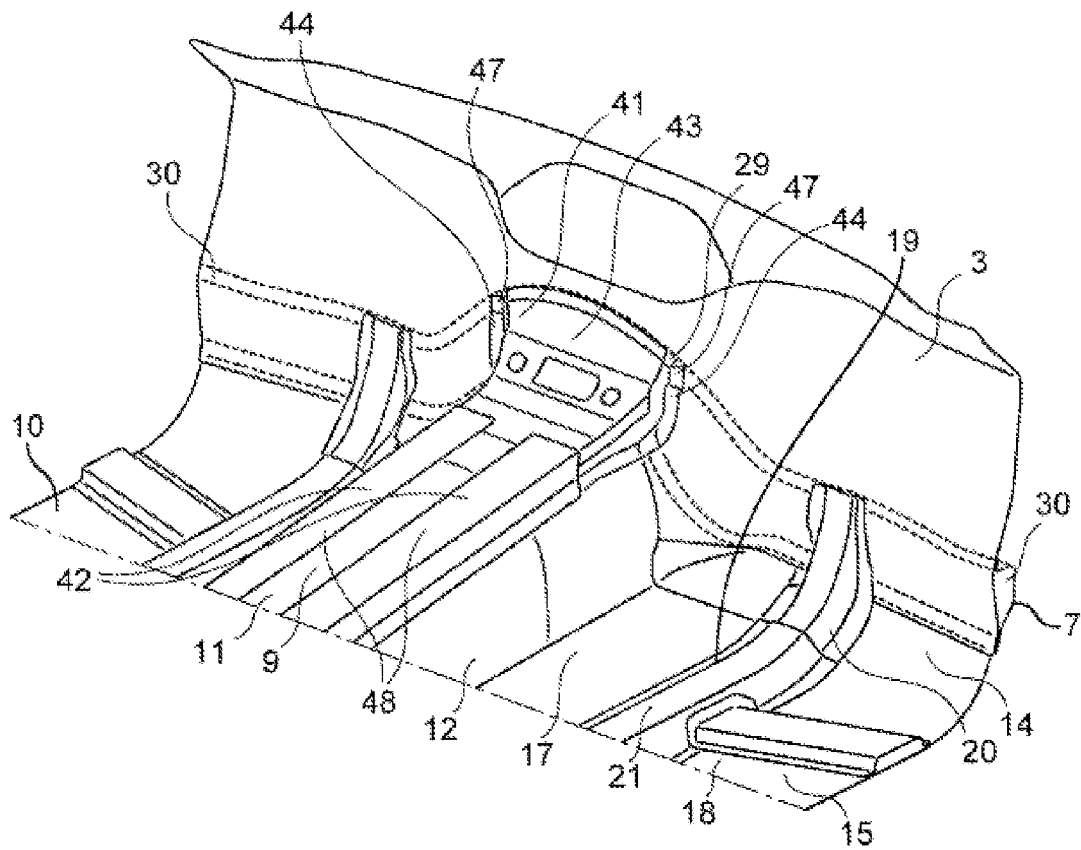
FIG. 4 is a perspective view of a cabin inner side of the vehicle body front portion to which the vehicle body structure according to the embodiment of the present disclosure is applied.

As illustrated in FIG. 4, a center tunnel 9 (a floor tunnel) located at a center in the vehicle width direction and right and left floor panels 10 located on both sides in the vehicle width direction of the center tunnel 9 are provided behind the dashboard 3. The center tunnel 9 is arranged substantially at the center in the vehicle width direction to extend in the front-rear direction, and has a tunnel top frame portion 11 and a tunnel side frame portion 12 extending downward from each end in the vehicle width direction of the tunnel top frame portion 11. A tunnel space 13 is formed to be surrounded by these tunnel top frame portion 11 and tunnel side frame portions 12. Front ends of the tunnel top frame portion 11 and the tunnel side frame portions 12 are coupled to the dashboard 3.

In regard to the front-rear direction, the floor panel 10 has: a front inclined section 14 that extends rearward while being curved obliquely downward from a lower end of the dashboard 3; and a rear plane section 15 that extends substantially horizontally and straight to the rear from a rear end of the front inclined section 14. In regard to the vehicle width direction, the floor panel 10 extends outward in the vehicle width direction from a lower end of the tunnel side frame portion 12, and a distal end thereof is coupled to a side sill 16 (see FIG. 3).

Figure 3:
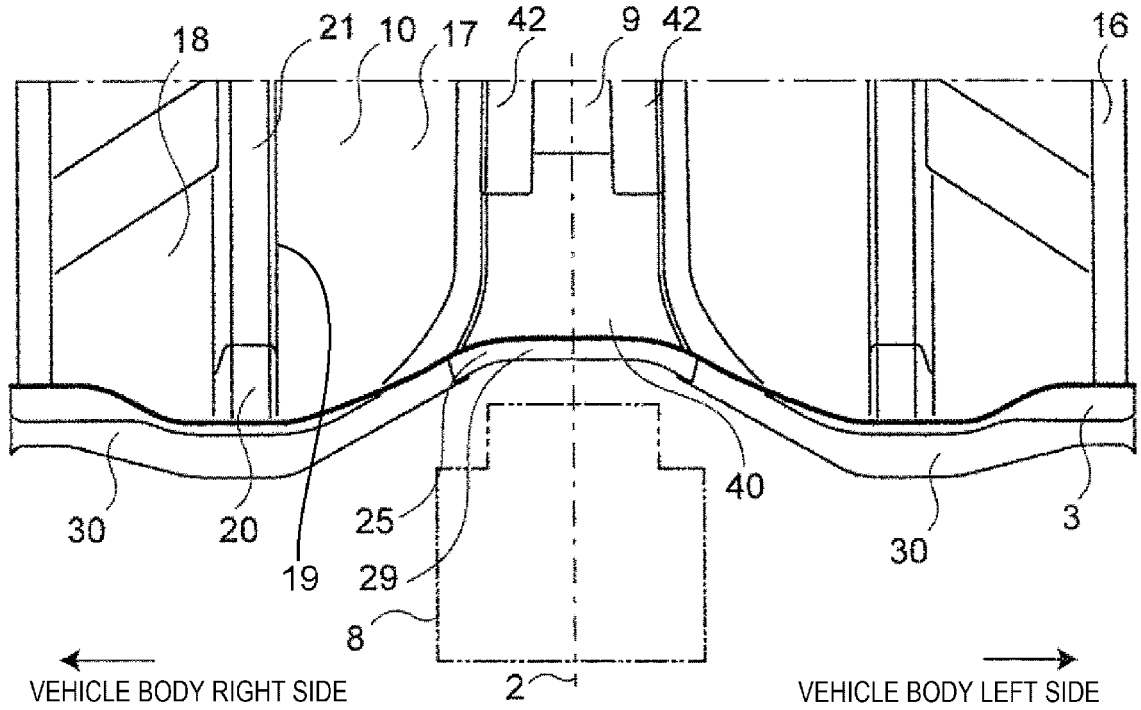
FIG. 3 is a cross-sectional view in a cross section that is taken along line A-A in FIG. 2 and seen in a vehicle down direction.

As illustrated in FIGS. 3 and 4, the floor panel 10 has: an inner floor panel section 17 that is located on an inner side in the vehicle width direction and is coupled to the tunnel side frame portion 12; and an outer floor panel section 18 that is located on an outer side in the vehicle width direction and is coupled to the side sill 16. An upper floor frame 19 having a substantially hat-shaped transverse section is arranged in a boundary portion, which extends in the front-rear direction, between the inner floor panel section 17 and the outer floor panel section 18.

As illustrated in FIG. 4, in this embodiment, the upper floor frame 19 has: a front upper frame section 20 located on the front inclined section 14 of the floor panel 10; and a rear upper frame section 21 located on the rear plane section 15 of the floor panel 10. The front upper frame section 20 has a shape that follows the front inclined section 14 of the floor panel 10 and the dashboard 3 and warps upward from a rear end toward a front end, and is coupled to the front inclined section 14 and the dashboard 3 by an appropriate coupling method (for example, welding). The rear upper frame section 21 extends substantially straight in the front-rear direction, and is coupled to the rear plane section 15 of the floor panel 10 by an appropriate coupling method (for example, welding). In these front upper frame section 20 and rear upper frame section 21, for example, a rear end portion of the front upper frame section and a front end portion of the rear upper frame section 21 are superposed, and superposed portions are coupled by an appropriate coupling method (for example, welding).

As illustrated in FIG. 1, in regard to the front-rear direction, the upper floor frame 19 is located substantially on the same line as the front side member 6. As illustrated in FIG. 4, at a position behind the dashboard 3, a front end portion of the front upper frame section 20 is located behind the dash crossmember 7. In addition, as described above, at a position in front of the dashboard 3, the front side member 6 is coupled to the dash crossmember 7. That is, in a front view that is seen from a vehicle front side, the upper floor frame 19 and the front side member 6 at least partially overlap each other. Accordingly, a force that acts on the front side member 6 during a frontal collision is reliably transmitted to the upper floor frame 19 via the dash crossmember 7 and the dashboard 3.

Figure 2:
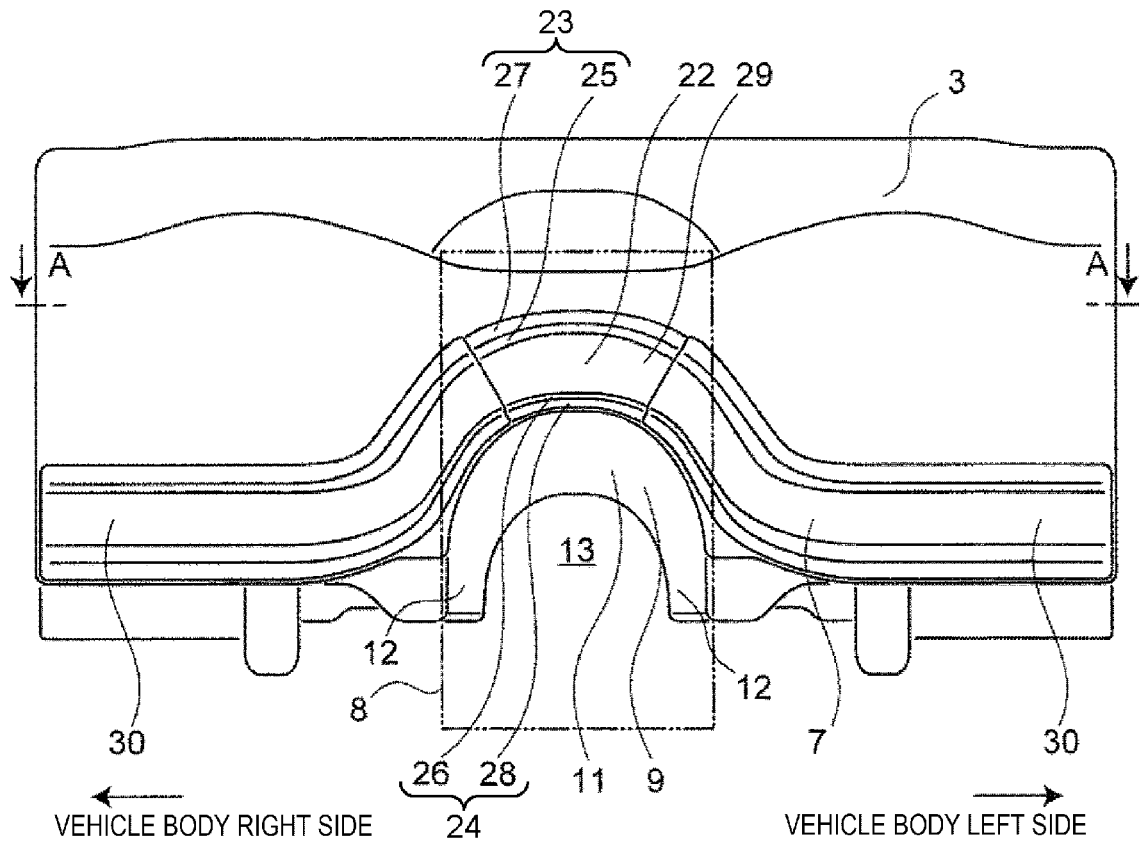
FIG. 2 is a front view of the vehicle body front portion to which the vehicle body structure according to the embodiment of the present disclosure is applied.

In a front view illustrated in FIG. 2, a central area in a lower end portion of the dashboard 3 is curved to be projected upward along an outer shape of the center tunnel 9. In addition, in a plan view illustrated in FIG. 3, a central area of the dashboard 3 is curved to be projected rearward. To conform to such a curved shape, a central area of the dash crossmember 7 is curved to be projected upward and rearward.

As illustrated in FIGS. 2 and 4, the dash crossmember 7 has a shape that is acquired by rotating a substantial hat shape 90 degrees, and has a vertical wall section 22 that extends along a vertical plane, an upper wall section 23, and a lower wall section 24. The upper wall section 23 has: a rearward extending section 25 that extends rearward from an upper end of the vertical wall section 22; and a flange section 27 that extends upward from a rear end of the rearward extending section 25. Similarly, the lower wall section 24 has: a rearward extending section 26 that extends rearward from a lower end of the vertical wall section 22; and a flange section 28 that extends downward from a rear end of the rearward extending section 26. The thus-configured dash crossmember 7 is fixed by coupling the upper and lower flange sections 27, 28 to the dashboard 3 by an appropriate coupling method (for example, welding).

The dash crossmember 7 has: a central member 29 (a first portion) that constitutes a central curved area; and a side member 30 (a second portion) that constitutes an area located on each side in the vehicle width direction of the dash crossmember 7. Preferably, each of end portions of those central member 29 and side members 30 is superposed on the end portion of the adjacent member and is coupled thereto by an appropriate coupling method (for example, welding). In this way, it is possible to prevent torsion of a vehicle body and improve vehicle body rigidity against an input load in the up-down direction during travel.

As illustrated in FIG. 3, it is determined that a length in the vehicle width direction of the central member 29 is longer than a length in the vehicle width direction of the engine 8 located in front of the central member 29 and that, in the front view, a lateral width of the engine 8 fits into a lateral width area of the central member 29. In other words, the central member 29 is arranged to overlap the engine 8 in the front view. In addition, rigidity or compressive strength (hereinafter the rigidity and the compressive strength will collectively be referred to as "compressive strength") of the central member 29 is designed to be lower than compressive strength of the side member 30. For this reason, the central member 29 is formed by processing a steel sheet with the compressive strength of 780 MPa, for example, and the side member 30 is formed by processing a hot steel sheet with the compressive strength of 1500 MPa, for example.

According to the thus-configured vehicle body structure 1, when the engine 8 moves rearward relative to the vehicle body structure 1 during the collision, the engine 8 hits the central member 29 located in a central portion of the dash crossmember 7. At this time, as described above, since the central member 29 has an easily deformable flexible structure that is formed of a material with the lower compressive strength than the side member 30, a large portion of collision energy of the engine 8 is absorbed by deformation of the central member 29. In this way, deformation of the dashboard 3 located behind the dash crossmember 7 is minimized. As a result, safety of a driver and a passenger on a front passenger seat in the cabin can be ensured.

In particular, in the above-described embodiment, since the length in the vehicle width direction of the central member 29 is longer than the length in the vehicle width direction of the engine 8, which is located in front of the central member 29, and the lateral width of the engine 8 fits into the lateral width area of the central member 29 in the front view, the engine 8 that moves rearward is reliably received by the central member 29 with the flexible structure, and the collision energy of the engine 8 is absorbed by the deformation of the central member 29.

Next, a description will be made on a backbone structure 40. The backbone structure 40 is provided on the cabin side of the dashboard 3 in order to prevent rearward deformation of the dashboard 3. The backbone structure 40 has a front backbone section 41 and a rear backbone section 42.

Figure 5:
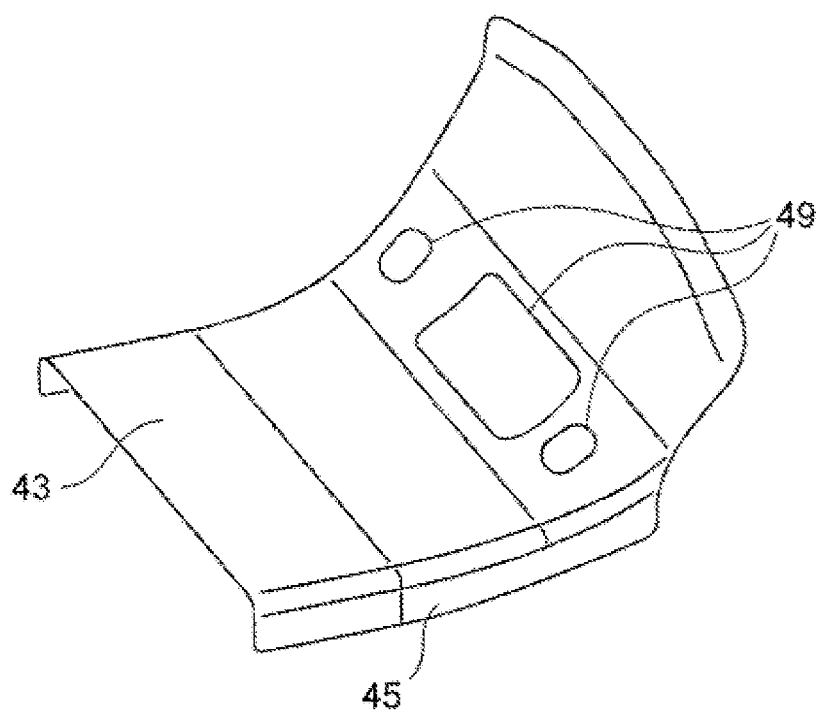
FIG. 5 is a perspective view of an upper backbone frame.
Figure 6:
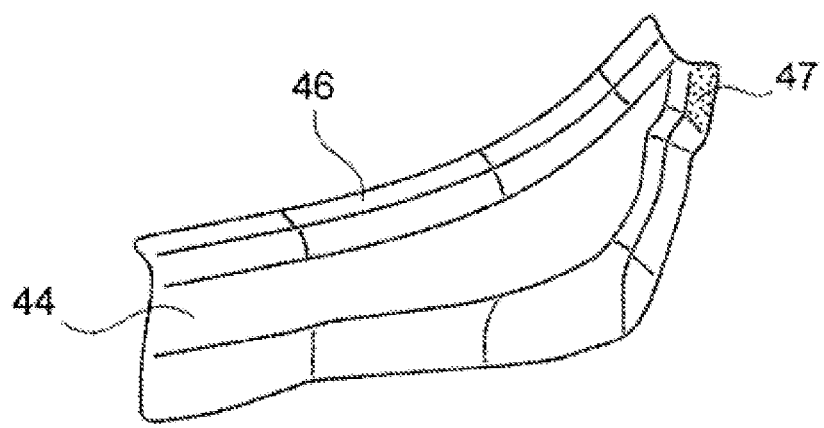
FIG. 6 is a perspective view of a lateral backbone frame.

The front backbone section 41 is configured to include: an upper backbone frame 43 that covers an upper portion of the center tunnel 9; and a lateral backbone frame 44 that is provided to an end portion in the vehicle width direction of the upper backbone frame 43. The upper backbone frame 43 extends obliquely downward and rearward in a curved shape from the rear surface of the dashboard 3. As illustrated in FIG. 5, the end portion in the vehicle width direction (the end portion extending in the front-rear direction) of the upper backbone frame 43 is formed with a downward flange 45 by folding an area from a substantial center to a rear end in the front-rear direction downward. Meanwhile, as illustrated in FIG. 6, an inward flange 46 in a shape that corresponds to the downward flange 45 of the upper backbone frame 43 is formed at an upper end of the lateral backbone frame 44. In addition, a substantially flat front-end joint section 47, which is highlighted in FIG. 6 and extends in the vehicle width direction, is formed in a front end portion of the lateral backbone frame 44.

The rear backbone section 42 has a pair of L-shaped backbone frames 48.

An upper end corner of the lateral backbone frame 44 is placed on an inner side of a corner on each side of the upper backbone frame 43, and the downward flange 45 of the upper backbone frame 43 and the inward flange 46 of the lateral backbone frame 44 are coupled by an appropriate coupling method (for example, welding). With such a configuration, a coupled portion between the upper backbone frame 43 and the lateral backbone frame 44 can be reinforced. In addition, even in the case where a shape of the front backbone section 41 is a shape that is difficult to be formed, such a shape can be made to a shape that is easy to be formed. The thus-assembled front backbone section 41 is fixed to the dashboard 3 by coupling a front end portion of the upper backbone frame 43 thereof to the rear surface of the dashboard 3 by an appropriate coupling method (for example, welding). In this state, the upper backbone frame 43 at least partially overlaps the dash crossmember 7 in the front view.

The lateral backbone frame 44 is coupled to the tunnel side frame portion 12 by an appropriate coupling method (for example, welding). In addition, the front-end joint section 47 of the lateral backbone frame 44 is coupled to the dashboard 3 by an appropriate coupling method (for example, welding). At this time, in the front view, an area where the front-end joint section 47 of the lateral backbone frame 44 is coupled to the dashboard 3 at least partially overlaps an area where the side member 30 (in particular, the upper flange section 27) of the dash crossmember 7 is joined to the dashboard 3. In the rear backbone section 42, a front portion thereof is placed on corners of the top frame portion 11 and the respective side frame portion 12 of the center tunnel 9 in a state of being superposed on the front backbone section 41, and is coupled thereto by an appropriate coupling method (for example, welding).

In this way, during the frontal collision, for example, during an offset collision in which only a part on the vehicle front side collides or during an oblique collision in which the vehicle collides obliquely from the front, a force that is transmitted from one of the front side members 6 to the dash crossmember 7 is transmitted to the vehicle body via the dash crossmember 7 and the dashboard 3 and either the front-end joint section 47 of the lateral backbone frame 44 or the front backbone section 41 and the rear backbone section 42. In this way, the deformation of the dashboard 3 is minimized. In addition, an upper corner or upper curved portion of the center tunnel 9 is reinforced by the rear backbone section 42.

As illustrated in FIG. 5, the upper backbone frame 43 is provided with a vulnerable section (an easily deformable section) 49 that is formed of a cross-sectional deficit section (for example, an opening). The vulnerable section 49 is provided at a position corresponding to a coupled portion between a front end portion of the center tunnel 9 and the dashboard 3. In this way, in the case where the force in the front-rear direction acts on the upper backbone frame 43 due to the frontal collision or the like, the upper backbone frame 43 is compressively deformed in the front-rear direction with deformation of the vulnerable section 49 being a trigger. As a result, the collision energy is absorbed, and a shock on an occupant is mitigated.

The opening in the upper backbone frame 43 not only functions as the vulnerable section but can also be used as a path to weld the members hidden under the upper backbone frame 43 through this opening.

The present disclosure is not limited to the exemplified embodiment, and various improvements and design changes can be made thereto within the scope that does not depart from the gist of the present disclosure.

For example, in the above embodiment, the compressive strength of the area of the dash crossmember opposing the engine is set to be lower than that of the other areas, so as to adopt the flexible structure for such an opposing area. However, the compressive strength of the opposing area may be lowered by reducing a thickness of a plate constituting the opposing area, partially thinning the plate, forming the plate with an opening (a circular, substantially circular, or rectangular hole, an elongated slit, or a slot), or the like.

In addition, in the above embodiment, the dash crossmember 7 is configured by combining the three members (the central member 29 and the right and left side members 30). However, the dash crossmember 7 may be constructed of a single member or may be configured by combining four or more members.

The above-described embodiment is summarized as follows.

The vehicle body structure according to this embodiment includes: the dashboard that extends in the vehicle width direction and defines the cabin and the power compartment in front of the cabin; the power unit arranged in the power compartment; the floor panel that extends rearward in the cabin from the dashboard; and the dash crossmember that is projected forward from the dashboard and extends in the vehicle width direction. The dash crossmember has: the first portion that at least partially overlaps the power unit in the front view at the time when the vehicle is seen from the front; and the second portion that extends outward in the vehicle width direction from the first portion. The compressive strength of the first portion is lower than the compressive strength of the second portion.

With this configuration, when the power unit moves rearward, the power unit hits the first portion of the dash crossmember. Since the first portion has the lower compressive strength than the second portion, the collision energy of the power unit is absorbed by the deformation of the first portion. Thus, it is possible to prevent the deformation of the dashboard behind the dash crossmember. At the same time, since the dash crossmember is provided to continuously extend in the vehicle width direction, it is possible to prevent the torsion of the vehicle body and improve the vehicle body rigidity against the input load in the up-down direction during the travel.

Preferably, the floor panel includes the floor tunnel that extends in the front-rear direction of the vehicle and is projected upward, the vehicle body structure has, in the cabin of the dashboard, the backbone structure that is joined to the dashboard and the floor tunnel, and the backbone structure has the front-end joint section that is joined to the dashboard at the overlapping position with the second portion in the front view.

With this configuration, the force that is transmitted from one side of the vehicle body to the dash crossmember due to the offset collision, the oblique collision, or the like is transmitted to the vehicle body via the dash crossmember, the dash panel, and the backbone structure. Thus, the deformation of the dashboard can be minimized.

Preferably, the backbone structure has the vulnerable section at the position corresponding to the coupled portion between the front end portion of the floor tunnel and the dashboard.

With this configuration, in the case where the force in the front-rear direction acts on the backbone structure due to the frontal collision or the like, the backbone structure is compressively deformed in the front-rear direction with the deformation of the vulnerable section being the trigger. As a result, the collision energy is absorbed, and the shock on the occupant can be mitigated.

Preferably, the backbone structure has an upper backbone frame that at least partially overlaps the dash crossmember in the front view.

With this configuration, the force that is transmitted to the dash crossmember due to the frontal collision or the like is reliably transmitted to the vehicle body via the upper backbone frame that overlaps the dash crossmember. Thus, the deformation of the dashboard can be prevented.

What is claimed is:

1. A vehicle body structure comprising:
   a dashboard that extends in a vehicle width direction and defines a cabin and a power compartment in front of the cabin;
   a power unit arranged in the power compartment;
   a floor panel that extends rearward in the cabin from the dashboard; and
   a dash crossmember that extends forward from a front side of the dashboard to the power compartment and extends in the vehicle width direction,
   wherein the dash crossmember has a first portion that at least partially overlaps the power unit in a front view when a vehicle is seen from the front and a second portion that extends outward in the vehicle width direction from the first portion, and
   wherein a compressive strength of the first portion is lower than a compressive strength of the second portion.

2. The vehicle body structure according to claim 1,
   wherein the floor panel includes a floor tunnel that extends in a front-rear direction of the vehicle and is projected upward, and
   the vehicle body structure has, in the cabin of the dashboard, a backbone structure that is joined to the dashboard and the floor tunnel, and the backbone structure has a front-end joint section that is joined to the dashboard at an overlapping position with the second portion in the front view.

3. The vehicle body structure according to claim 2,
   wherein the backbone structure has a vulnerable section at a position corresponding to a coupled portion between a front end portion of the floor tunnel and the dashboard.

4. The vehicle body structure according to claim 3,
   wherein the backbone structure has an upper backbone frame that at least partially overlaps the dash crossmember in the front view.

5. The vehicle body structure according to claim 2,
   wherein the backbone structure has an upper backbone frame that at least partially overlaps the dash crossmember in the front view.

6. The vehicle body structure according to claim 1, wherein a length in the vehicle width direction of the second portion is greater than a length in the vehicle width direction of the power unit located in front of the second portion.

7. The vehicle body structure according to claim 6, wherein in the front view, a lateral width of the power unit fits into a lateral width area of the second portion.

* * * * *